No. 852,674. PATENTED MAY 7, 1907.
A. L. McMURTRY.
MOTOR DRIVEN VEHICLE.
APPLICATION FILED JAN. 28, 1907.

Witnesses
Max B. A. Doring
L. F. Browning

Inventor
Alden L. McMurtry
By his Attorney
Edward C. Davidson

UNITED STATES PATENT OFFICE.

ALDEN L. McMURTRY, OF NEW YORK, N. Y.

MOTOR-DRIVEN VEHICLE.

No. 852,874.

Specification of Letters Patent.

Patented May 7, 1907.

Application filed January 28, 1907. Serial No. 354,394.

*To all whom it may concern:*

Be it known that I, ALDEN L. MCMURTRY, a citizen of the United States, residing in the borough of Manhattan, city, county, and State of New York, have invented certain Improvements in Motor-Driven Vehicles, of which the following is a specification.

This invention comprises novel means, hereinafter specifically set forth and claimed, of carrying upon the body of a motor driven vehicle one or more reserve rims each of which may have the usual shoe and air tube ready for use.

Figure 1:
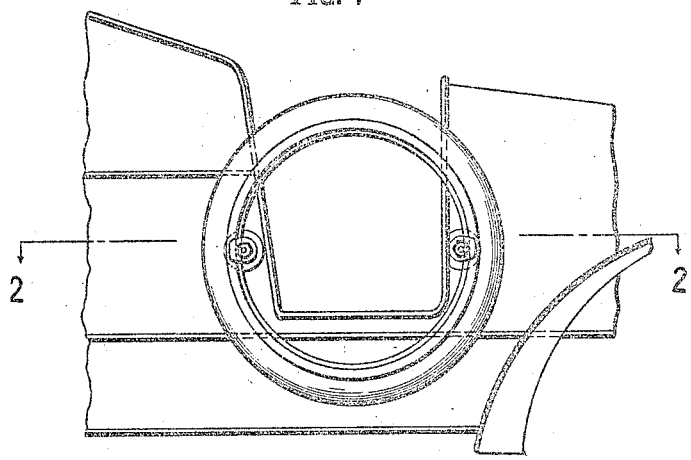
Figure 2:
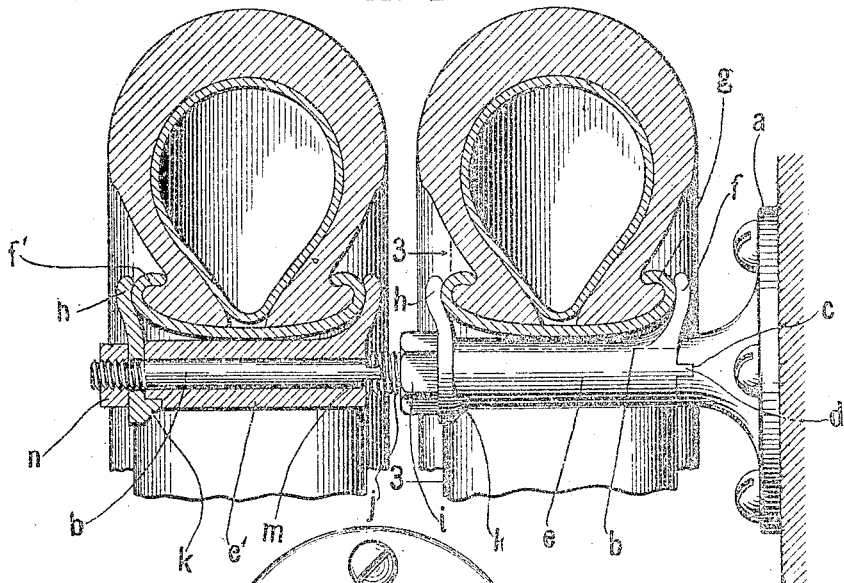
Figure 3:
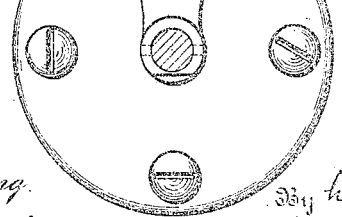

In the accompanying drawings: Figure 1 is a partial side elevation; Fig. 2, an enlarged section on the line 2, 2, of Fig. 1: and Fig. 3, a section on the line 3, 3, of Fig. 2.

Attached to the body of the vehicle on either side of one of the entrances thereto, or otherwise appropriately placed, are brackets $a$ supporting outwardly extended bolts $b$. The face of the bracket is recessed as at $c$ to receive a lug $d$ on a sleeve $e$ surrounding the bolt. There may be one or more such interlocking joints $c, d$. The purpose is to provide a ready means for preventing turning movement of the sleeve on the bolt. The inner end of the sleeve abuts against the bracket interlocking therewith and has a projecting lug $f$ appropriately shaped and against which the tire rim $g$ is pressed or clamped there being upon the opposite side of the rim a clamping plate $h$ applied over the bolt at the end of the sleeve and held by a nut $i$ working upon a thread $j$ formed on the bolt intermediate its ends. The clamping plate $h$ has a projection $k$ seating in a socket in the under face of the sleeve and serving to prevent turning movement of the plate.

Beyond the thread $j$, the bolt $b$ is of reduced diameter and in the sides of the thread are cut one or more recesses $m$ in which are seated lugs (corresponding with those $d$ on the sleeve $e$) forming part of a second sleeve $e'$ applied over the outer portion of the bolt. This sleeve has a suitably shaped lug $f$ and a clamping plate $h$ interlocking as already described with the sleeve and serving, under the stress, of a nut $n$ applied to the threaded end of the bolt to clamp and support a second rim $f''$. Two such bolts with the equipment described, or equivalent thereof, arranged diametrically opposite with reference to the diameter of the reserve wheel rims, afford a secure and convenient way of carrying two reserve rims.

I claim:

1. In combination with a motor driven vehicle, means for carrying reserve wheel rims comprising a plurality of bolts projecting from the body of the vehicle, a wheel rim supporting sleeve enveloping each bolt and having a projection at one end adapted to engage one side of a wheel rim, a clamping device mounted upon the bolt at the other end of the sleeve and adapted to engage the other side of a wheel rim and means whereby a wheel rim may be detachably clamped between said device and the projection at the end of the sleeve.

2. In combination with a motor driven vehicle, means for carrying reserve wheel rims comprising a plurality of bolts projecting from the body of the vehicle, a wheel rim supporting sleeve enveloping each bolt and having a projection at one end adapted to engage one side of a wheel rim, a clamping device mounted upon the bolt at the other end of the sleeve and adapted to engage the other side of a wheel rim and means whereby a wheel rim may be detachably clamped between said device and the projection at the end of the sleeve and means for preventing rotation of the sleeve on the bolt.

3. Means for carrying reserve wheel rims comprising a bolt supporting bracket adapted to be attached to the side of the vehicle, a sleeve enveloping the bolt, having interlocking connection with the bracket to prevent rotation of the sleeve and a projection at one end adapted to clamp one side of a wheel rim, a clamping plate at one end of the sleeve adapted to engage the other side of the wheel rim, enveloping the bolt and having interlocking connection with the sleeve to prevent rotation of the plate and a clamp nut engaging a thread on the bolt.

4. In combination with a motor driven vehicle, means for carrying reserve wheel rims comprising a plurality of bolts projecting from the body of the vehicle each bolt having two parts of unequal diameter that of the largest diameter being adjacent the side of the vehicle and two threads one at the outer end of each such part of the bolt, a sleeve enveloping the part of larger diameter adjacent the vehicle body and having a projection adapted to engage one side of a wheel rim, means for preventing rotation of the sleeve, a clamping device enveloping the bolt at the other end of the sleeve, means for preventing the rotation of the clamping device and a clamp nut working on the threaded part of the bolt intermediate its ends, a second rim supporting sleeve mounted upon the outer part of the bolt and having a projection at one end adapted to engage the side of the wheel rim means for preventing rotation of the sleeve, a clamping device at the other end of the second sleeve and enveloping the bolt and adapted to clamp the other side of the wheel rim, means for preventing rotation of the clamping device and a clamp nut applied at the end of the bolt.

5. In combination with a motor driven vehicle, means for carrying reserve wheel rims comprising a plurality of bolt supporting brackets attached to the side of the vehicle, bolts carried thereby and having an inner portion of one diameter threaded at its outer end and an outer portion of less diameter threaded at its outer end, a sleeve enveloping the portion of the bolt of larger diameter having a projection adapted to engage one side of a wheel rim, an interlocking connection between the sleeve and bracket to prevent rotation of the former, a clamping plate at the other end of said sleeve adapted to engage the other side of the wheel rim and having interlocking connection with the sleeve and a clamp nut applied to the thread on such portion of the bolt, a second rim supporting sleeve applied to the part of the bolt of less diameter and having at its inner end a projection adapted to engage one side of a wheel rim, an interlocking connection between the sleeve and bolt to prevent rotation of the former, a clamp plate at the other side of a wheel rim, an interlocking connection between it and the last named sleeve and a clamp nut applied upon the end of the bolt.

In testimony whereof, I have hereunto subscribed my name.

ALDEN L. McMURTRY.

Witnesses:
L. F. BROWNING,
E. F. WICKS.